United States Patent
Yamashita

(10) Patent No.: US 10,872,264 B2
(45) Date of Patent: Dec. 22, 2020

(54) SHELF SPACE ALLOCATION MANAGEMENT DEVICE AND SHELF SPACE ALLOCATION MANAGEMENT METHOD

(71) Applicant: NEC Corporation, Tokyo (JP)

(72) Inventor: Nobuyuki Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/125,383

(22) Filed: Sep. 7, 2018

(65) Prior Publication Data
US 2019/0002201 A1 Jan. 3, 2019

Related U.S. Application Data

(63) Continuation of application No. 15/544,750, filed as application No. PCT/JP2016/051568 on Jan. 20, 2016, now abandoned.

(30) Foreign Application Priority Data

Jan. 22, 2015 (JP) .................................. 2015-009978

(51) Int. Cl.
*G06K 9/62* (2006.01)
*G06Q 30/06* (2012.01)
(Continued)

(52) U.S. Cl.
CPC .............. *G06K 9/62* (2013.01); *B64C 39/024* (2013.01); *B65G 1/137* (2013.01); *G05D 1/0094* (2013.01);
(Continued)

(58) Field of Classification Search
CPC ..... G06K 9/62; G06K 9/6202; G06Q 30/0639
See application file for complete search history.

(56) References Cited

U.S. PATENT DOCUMENTS 6,304,855 B1 * 10/2001 Burke .................. G06Q 10/087
235/383
8,189,926 B2 * 5/2012 Sharma .............. G06K 9/00771
382/224
(Continued)

FOREIGN PATENT DOCUMENTS

JP 5-81552 4/1993
JP 2001-88912 4/2001
(Continued)

OTHER PUBLICATIONS

Final Office Action U.S. Appl. No. 15/554,750, dated Feb. 11, 2019, in the United States Patent and Trademark Office.
(Continued)

*Primary Examiner* — Thomas Randazzo
(74) *Attorney, Agent, or Firm* — Finnegan, Henderson, Farabow, Garrett & Dunner, L.L.P.

(57) ABSTRACT

A shelf space allocation management device manages products allocated on shelves aligned in a store by use of an image captured by an imaging device. The shelf space allocation management device acquires an image including a position assumed to be changed in allocation status of each product on each shelf, it determines whether the type and the allocation status of each product reflected in the image match the predetermined type and the predetermined allocation status; then, it determines whether to execute a product allocation inspection based on the determination result. Herein, the shelf space allocation management device specifies a position at which a person conducts a behavior to cause any change in the allocation status of each product on each shelf, and therefore it may control the imaging device to capture an image including the position. It is possible to carry out a product allocation inspection for each period determined in advance depending on the type of each
(Continued)

product, or it is possible to carry out a product allocation inspection being triggered by a customer purchasing each product.

18 Claims, 9 Drawing Sheets

(51) Int. Cl.
| | |
|---|---|
| B64C 39/02 | (2006.01) |
| G06K 9/00 | (2006.01) |
| H04N 7/18 | (2006.01) |
| G06Q 10/08 | (2012.01) |
| G06K 9/22 | (2006.01) |
| G05D 1/00 | (2006.01) |
| B65G 1/137 | (2006.01) |
| G06K 9/20 | (2006.01) |

(52) U.S. Cl.
CPC ..... *G06K 9/00335* (2013.01); *G06K 9/00369* (2013.01); *G06K 9/00624* (2013.01); *G06K 9/00671* (2013.01); *G06K 9/00771* (2013.01); *G06K 9/22* (2013.01); *G06K 9/6201* (2013.01); *G06K 9/6202* (2013.01); *G06K 9/6212* (2013.01); *G06Q 10/087* (2013.01); *G06Q 30/0639* (2013.01); *H04N 7/18* (2013.01); *B64C 2201/00* (2013.01); *B64C 2201/123* (2013.01); *G06K 9/00288* (2013.01); *G06K 9/00342* (2013.01); *G06K 9/209* (2013.01)

(56) References Cited

U.S. PATENT DOCUMENTS

| | | | | |
|---|---|---|---|---|
| 8,630,924 | B2* | 1/2014 | Groenevelt | G06Q 10/087 705/28 |
| 8,922,163 | B2* | 12/2014 | Macdonald | A47F 10/00 320/109 |
| 9,305,216 | B1 | 4/2016 | Mishra | |
| 9,636,825 | B2* | 5/2017 | Penn | B25J 9/1697 |
| 9,659,272 | B2* | 5/2017 | Birch | G06Q 10/087 |
| 2006/0149634 | A1* | 7/2006 | Pelegrin | G06Q 30/02 705/317 |
| 2007/0246610 | A1* | 10/2007 | Rath | G05D 1/0022 244/189 |
| 2007/0288296 | A1* | 12/2007 | Lewis | G06Q 30/02 186/52 |
| 2008/0159634 | A1* | 7/2008 | Sharma | G06K 9/00771 382/224 |
| 2008/0208719 | A1* | 8/2008 | Sharma | G06Q 10/00 705/29 |
| 2008/0215462 | A1* | 9/2008 | Sorensen | G06Q 10/06 705/28 |
| 2009/0059270 | A1* | 3/2009 | Opalach | G06Q 10/087 358/1.15 |
| 2009/0063306 | A1* | 3/2009 | Fano | G06Q 10/087 705/28 |
| 2010/0138281 | A1 | 6/2010 | Zhang et al. | |
| 2010/0171826 | A1* | 7/2010 | Hamilton | G06Q 30/06 348/135 |
| 2011/0025461 | A1* | 2/2011 | Nobutsugu | G07G 1/009 340/5.92 |
| 2013/0051667 | A1* | 2/2013 | Deng | G06K 9/6203 382/168 |
| 2013/0235206 | A1* | 9/2013 | Smith | G06Q 10/087 348/150 |
| 2014/0006229 | A1* | 1/2014 | Birch | G06Q 10/087 705/28 |
| 2014/0277854 | A1* | 9/2014 | Jones | G06Q 30/0261 701/3 |
| 2014/0324627 | A1 | 10/2014 | Haver et al. | |
| 2014/0344118 | A1* | 11/2014 | Parpia | G06Q 10/087 705/28 |
| 2015/0088641 | A1* | 3/2015 | Aoki | G06Q 30/0251 705/14.49 |
| 2015/0088701 | A1* | 3/2015 | Desmarais | G06Q 10/087 705/28 |
| 2015/0178565 | A1* | 6/2015 | Rivlin | G06T 7/246 382/103 |
| 2015/0213498 | A1* | 7/2015 | Ito | G06Q 30/0261 705/14.58 |
| 2015/0242918 | A1 | 8/2015 | Donovan | |
| 2015/0321758 | A1* | 11/2015 | Sarna, II | B64C 39/024 244/63 |
| 2015/0379366 | A1* | 12/2015 | Nomura | G06K 9/46 382/203 |
| 2016/0179096 | A1* | 6/2016 | Bradlow | G05D 1/0669 701/8 |
| 2016/0210829 | A1* | 7/2016 | Uchida | G08B 13/19645 |
| 2017/0270475 | A1 | 9/2017 | Cohen et al. | |
| 2017/0300757 | A1* | 10/2017 | Wolf | G06K 9/3233 |
| 2018/0005309 | A1 | 1/2018 | Croy et al. | |
| 2019/0087772 | A1 | 3/2019 | Medina et al. | |

FOREIGN PATENT DOCUMENTS

| | | |
|---|---|---|
| JP | 2003-230131 | 8/2003 |
| JP | 2003-323539 | 11/2003 |
| JP | 2005-286619 | 10/2005 |
| JP | 2006-113711 | 4/2006 |
| JP | 2006-309280 | 11/2006 |
| JP | 2008-15577 | 1/2008 |
| JP | 2008-537226 | 9/2008 |
| JP | 2009-3701 | 1/2009 |
| JP | 2014-164594 | 9/2014 |
| JP | 2014-170431 | 9/2014 |
| JP | 2014-222374 | 11/2014 |
| JP | 2016-81364 | 5/2016 |

OTHER PUBLICATIONS

Office Action dated Mar. 23, 2020, issued in co-pending U.S. Appl. No. 16/125,308.
Advisory Action dated Dec. 6, 2019, issued in co-pending U.S. Appl. No. 16/125,308.
Notification of Reasons for Refusal dated Nov. 27, 2018, by Japanese Patent Office in counterpart Japanese Patent Application 2016-570681.
Final Office Action dated Nov. 18, 2019, issued in co-pending U.S. Appl. No. 15/544,750.
International Search Report dated Apr. 12, 2016, in corresponding PCT International Appiication.
Notification of Reasons for Refusal dated May 22, 2018, by Japanese Patent Office in counterpart Japanese Patent Application 2016-570681.

\* cited by examiner

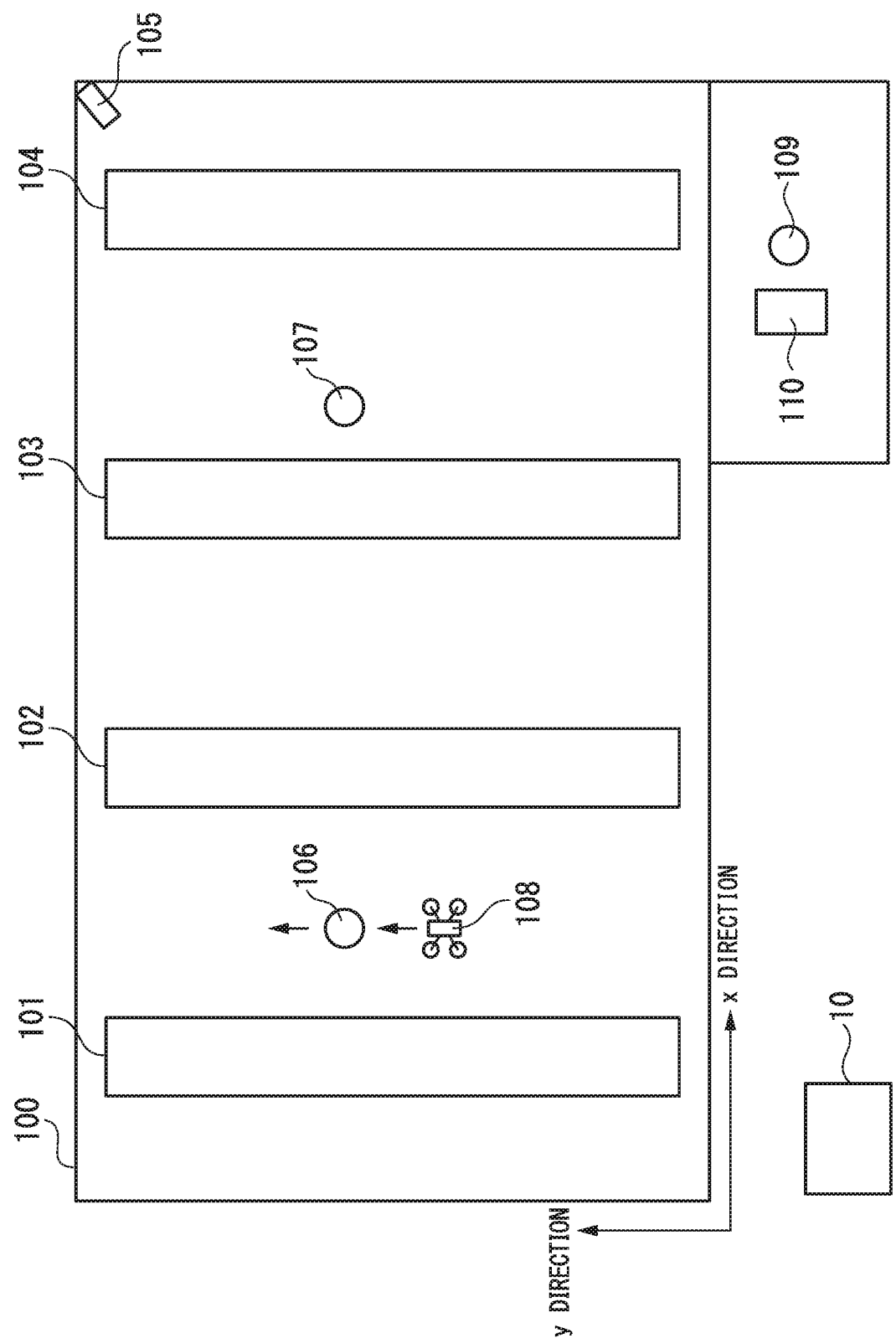

FIG. 4A

| PRODUCT ID | PRODUCT IMAGE 1 | PRODUCT IMAGE 2 | ... | PRODUCT IMAGE N |
|---|---|---|---|---|
| A | XXXXXX | XXXXXX | ... | XXXXXX |
| ... | ... | ... | ... | ... |

FIG. 4B

| SHELF ID | POSITION INFORMATION |
|---|---|
| 001 | (x, y, z) |
| ... | ... |

FIG. 4C

| SHELF ID | PRODUCT ID | MINIMUM NUMBER | CURRENT NUMBER | LAST CHECK TIME |
|---|---|---|---|---|
| 001 | A | 10 | 8 | hh:mm:ss |
| ... | ... | ... | ... | ... |

FIG. 9A

| PRODUCT ID | FREQUENCY |
|---|---|
| A | EVERY HOUR |
| B | EVERY TWENTY-FOUR HOURS |
| C | EVERY SEVENTY-TWO HOURS |
| ... | ... |

FIG. 9B

| SHELF ID | FREQUENCY |
|---|---|
| 001 | EVERY HOUR |
| 002 | EVERY TWENTY-FOUR HOURS |
| 003 | EVERY SEVENTY-TWO HOURS |
| ... | ... |

SHELF SPACE ALLOCATION MANAGEMENT DEVICE AND SHELF SPACE ALLOCATION MANAGEMENT METHOD

CROSS-REFERENCE TO RELATED PATENT APPLICATIONS

This application is a continuation of U.S. patent application Ser. No. 15/544,750, filed Jul. 19, 2017, which is a National Stage Entry of International Application No. PCT/JP2016/051568, filed Jan. 20, 2016, which claims priority from Japanese Patent Application No. 2015-009978, filed Jan. 22, 2015. The entire contents of the above-referenced applications are expressly incorporated herein by reference.

TECHNICAL FIELD

The present invention relates to a shelf space allocation management device and a shelf space allocation management method for managing products allocated on shelves (i.e. shelf space allocation of products).

The present application claims the benefit of priority on Japanese Patent Application No. 2015-9978 filed on Jan. 22, 2015, the subject matter of which is hereby incorporated herein by reference.

BACKGROUND ART

Conventionally, clerks have managed products by allocating products on shelves (i.e. shelf space allocation of products) in distribution-retail stores. They may visually recognize products so as to manually count and check the number of products displayed on shelves. To automatically check shelves by way of image recognition, clerks or operators of marketing researches may have recognized objects or products from images captured by imaging devices. In addition, they may have determined the presence/absence of products by use of electronic readers for RIFD (Radio Frequency Identification) tags attached to products.

Various documents have been known with respect to image recognition of products. For example, Patent Literature 1 discloses a product monitoring system that processes images representing statuses of displaying products so as to determine the timings of supplementing products based on time-series variations of images. Patent Literature 2 discloses an inventory management method using image recognition of products displayed on shelves and captured by multiple cameras. This method uses mobile cameras in stores, and therefore cameras are moved under a predetermined procedure so as to capture images of products and thereby check the number of products by way of image recognition. Patent Literature 3 discloses a technology of recognizing the type of products being imaged by way of comparison between the images captured by cameras and the features of products stored on a database.

CITATION LIST

Patent Literature

Patent Literature 1: Japanese Patent Application No. H05-81552
Patent Literature 2: Japanese Patent Application No. 2001-88912
Patent Literature 3: Japanese Patent Application No. 2014-164594

SUMMARY OF INVENTION

Technical Problem

Originally, it is preferable to provide a wide range of products on shelves without losing product-purchasing chances by customers. For this reason, it is necessary to check the number of products at an appropriate timing. However, clerks need to manually capture images of products even when shelf inspection is automated using image recognition, and therefore they may fail to capture images of products in busy periods of duties. The product management using RFID tags attached to products my need operation costs for attaching RIFD tags to products. In addition, it is necessary to reexamine manufacturing and shipping processes. The inventory management method of Patent Literature 2 needs to capture images of products under a predetermined procedure, and therefore it is difficult to efficiently carry out image recognition and thereby grasp the statue of products displayed on shelves in real time.

The present invention aims to provide a shelf space allocation management device and a shelf space allocation management method, which can efficiently carry out image recognition of products so as to check the allocation of products and the number of products on shelves.

Solution to Problem

A first aspect of the present invention relates to a shelf space allocation management device for managing products allocated on a shelf. The shelf space allocation management device includes an image acquisition part configured to acquire an image including a position assumed to be changed in an allocation status of each product on the shelf; an allocation status determination part configured to determine whether a type and an allocation status of each product reflected in the image match a predetermined type and a predetermined allocation status of each product; and an execution determination part configured to execute a product allocation inspection based on the determination result of the allocation status determination part.

A second aspect of the present invention relates to a shelf space allocation management system for managing products allocated on a shelf. The shelf space allocation management system includes an imaging device configured to capture an image of each product while moving along the shelf; and the aforementioned shelf space allocation management device.

A third aspect of the present invention relates to a shelf space allocation management method for managing products allocated on a shelf. The shelf space allocation management method includes the steps of: acquiring an image including a positon assumed to be changed in allocation status of each product on the shelf; determining whether a type and an allocation status of each product reflected in the image match a predetermined type and a predetermined allocation status of each product; and determining whether to execute a product allocation inspection based on the determination result. In addition, it is possible to provide a program that causes a computer to implement the aforementioned shelf space allocation management method.

Advantageous Effects of Invention

According to the present invention, it is possible to automatically check the status of allocating products on shelves arranged in a store by way of image recognition. In addition, it is possible to efficiently check the allocation of products at an appropriate timing.

BRIEF DESCRIPTION OF DRAWINGS

FIG. 3 is a layout plan of a store adopting a product allocation management system according to one embodiment of the present invention.

FIG. 4A shows an example of a product table registered in a product database stored on a storage unit of the product management device.

FIG. 4B shows an example of a map information table registered in a map information database stored on the storage unit of the product management device.

FIG. 4C shows an example of a product allocation table registered in a shelf space allocation database stored on the storage unit of the product management device.

FIG. 9A shows a product inspection frequency table stored on the storage unit of the product management device.

FIG. 9B shows a shelf inspection frequency table stored on the storage unit of the product management device.

DESCRIPTION OF EMBODIMENTS

A shelf space allocation management device and a shelf space allocation management method according to the present invention will be described in detail with reference to the accompanying drawings.

Figure 1:
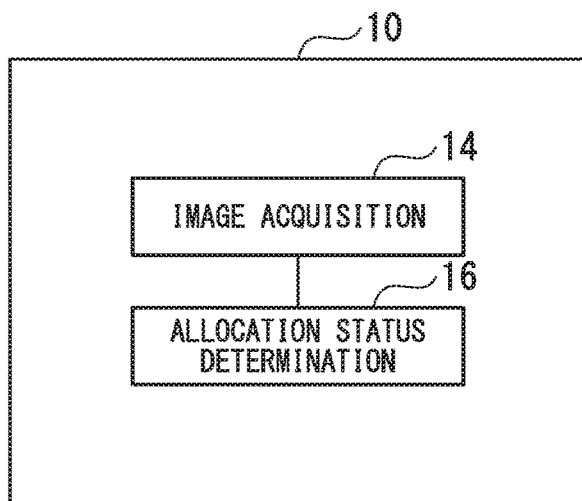
FIG. 1 is a block diagram showing the minimum configuration of a product management device according to one embodiment of the present invention.

FIG. 1 is a block diagram showing the minimum configuration of a shelf space allocation management device (hereinafter, referred to as a product management device) 10 according to one embodiment of the present invention. The product management device 10 includes an image acquisition part 14 and an allocation status determination part 16. Herein, it is possible to adopt a computer having a CPU as the product management device 10. Upon assuming any changes occurring in the status of allocating products, the image acquisition part 14 captures an image including the position of any product assumed to be changed in its status. The image acquisition part 14 may capture moving images or still images. The allocation status determination part 16 determines whether a product reflected in an image captured by the image acquisition part 14 is of a predetermined type or in a predetermined allocation status.

Figure 2:
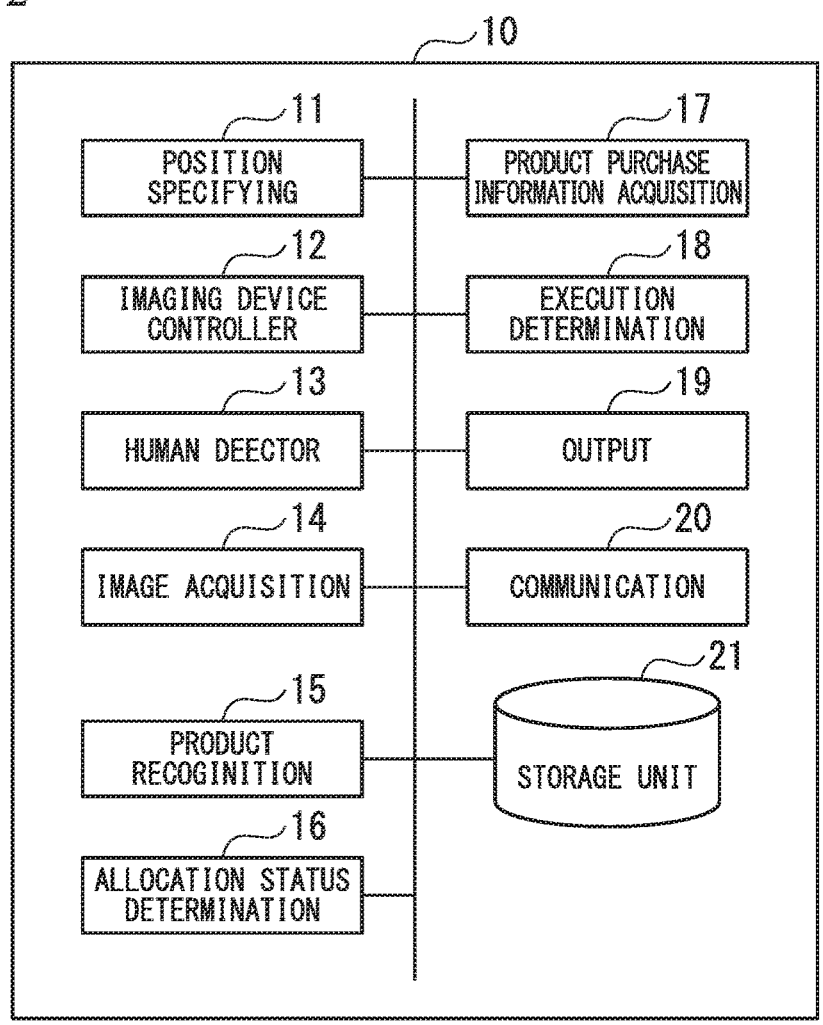
FIG. 2 is a block diagram showing the detailed configuration of the product management device according to one embodiment of the present invention.

FIG. 2 is a block diagram showing the detailed configuration of the product management device 10 according to one embodiment of the present invention. The product management device 10 checks appropriateness with respect to the type of each product, the allocation status for each product, the number of products, and the allocation method of products. For example, the allocation status represents the number of products and the allocation of products on shelves in rows and columns. Hereinafter, the operation for checking the type of each product and the allocation status for each product will be referred to as product allocation inspection.

The product management device 10 includes a position specifying part 11, an imaging device controller 12, a human detector 13, an image acquisition part 14, a product recognition part 15, an allocation status determination part 16, a product purchase information acquisition part 17, an execution determination part 18, an output part 19, a communication part 20, and a storage unit 21. Herein, the image acquisition part 14 and the allocation status determination part 16 are included in the minimum configuration shown in FIG. 1.

The position specifying part 11 specifies the position of any product assumed to be changed in its allocation status. The imaging device controller 12 controls the movement of an imaging device (not shown) and the timing of starting or stopping imaging. The human detector 13 detects whether each product is assumed to be changed in its allocation status by a person reflected in an image captured by an imaging device. The product recognition part 15 recognizes which product is regarded as an object reflected in an image captured by an imaging device with reference to images of products registered in a product database (not shown) prepared in advance. The product purchase information acquisition part 17 acquires the information of each product purchased by a customer. For example, the product information represents any product selected by a customer and the number of products purchased by a customer. The output part 19 outputs a message to a display device connected to the product management device 10. For example, the output part 19 outputs a message concerning the current allocation status of products and urging a clerk displaying products. The communication part 20 communicates with an external device. The storage unit 21 stores various pieces of information such as a product database registering images of products, a map information database representing the location of each shelf in a store, and a shelf space allocation database representing which product should be displayed on a specified shelf and the number of products displayed thereon.

FIG. 3 shows a layout plan of a store adopting a shelf space allocation management system according to one embodiment of the present invention. Herein, shelves 101 through 104 and a surveillance imaging device 105 are arranged on a floor 100 of a store. In addition, a mobile imaging device 108 is arranged on the floor 100. FIG. 3 shows that a clerk 106 walks around the floor 100 so as to visually recognize the shelves 101 through 104 while a customer 107 is selecting any product displayed on the shelf 103. In addition, another clerk 109 may receive payment and settles its account for any product purchased by a customer by use of a register 110. FIG. 3 shows a shelf space allocation management system including the product management device 10 and the mobile imaging device 108.

The mobile imaging device 108 moves on the floor 100 so as to capture an image in a predetermined scope of imaging based on the allocated positions of products subjected to inspection and displayed on the shelves 101 through 104. For example, the predetermined scope of imaging may entirely cover the allocated position of each product to reflect an explanatory tag (e.g. POP advertisement) for each product. Images captured by the mobile imaging device 108 are subjected to product allocation inspection for the product management device 10.

For example, it is possible to use an unmanned air vehicle (or a drone) having an automatic tracking function and an imaging device as the mobile imaging device 108. The unmanned air vehicle may wirelessly communicate with a mobile terminal device worn by the clerk 106. In addition, the unmanned air vehicle may acquire the positional information of a mobile terminal device so as to track the movement of the clerk 106 while holding a predetermined relative positional relationship with a mobile terminal device. As an automatic tracking method, it is possible to track the clerk 106 by way of image recognition for identifying the clerk 106 based on an image captured by the mobile imaging device 108.

As a moving method, it is possible for an unmanned air vehicle to move and follow after the clerk 106 with holding a certain distance by way of an automatic tracking function. In addition, it is possible to control the position of an unmanned air vehicle in response to a command signal from the imaging device controller 12 of the product management device 10. In this case, for example, the unmanned air vehicle can be equipped with a GPS device to transmit its current position to the product management device 10. The imaging device controller 12 transmits to the unmanned air vehicle via the communication part 20 a command signal indicating the direction of moving the unmanned air vehicle based on a predetermined target position and the positional information acquired from the unmanned air vehicle. In addition, the imaging device controller 12 transmits to the unmanned air vehicle a command signal indicating that the unmanned air vehicle should stop when it arrives at a target position. In this connection, it is possible to switch over an automatic tracking mode of an unmanned air vehicle and a position control mode of an unmanned air vehicle by the imaging device controller 12.

For example, an unmanned air vehicle may be equipped with an imaging device to capture an image in a traveling direction. Alternatively, the imaging device may capture an image in a scope of 360° around an unmanned air vehicle. According to an instruction to start imaging by the imaging device controller 12, the mobile imaging device 108 starts to capture an image. According to an instruction to stop imaging by the imaging device controller 12, the mobile imaging device 108 stops to capture an image. The mobile imaging device 108 transmits its captured image to the product management device 10.

In the product management device 10, the image acquisition part 14 acquires images captured by the mobile imaging device 108 so as to send images to the product recognition part 15. The product recognition part 15 analyzes images so as to recognize which product corresponds to objects reflected in images by way of the known image recognition technology. For example, the product recognition part 15 compares multiple features in images of various products, which are registered in the product database stored on the storage unit 21, with multiple features in captured images of products so as to specify a product having the largest number of matched features as a product reflected in an image captured by the image acquisition part 14. In addition, the product recognition part 15 specifies products reflected in an image so as to determine which product is being reflected in an image while counting the number of products. For example, the product recognition part 15 compares features such as patterns of wrapping and outlines of images of products, which are registered in the product database, with features such as outlines of objects reflected in images captured by the image acquisition part 14, thus counting the number of specified products being reflected in images. Moreover, the product recognition part 15 determines the mutual positional relationship based on positional information for images of specified products so as to determine the number of rows and the number of columns for allocating products on each shelf.

After the product recognition part 15 determines the type of products and the number of products displayed on each shelf, the allocation status determination part 16 determines whether those products are subjected to an appropriate allocation of products. For example, the allocation status determination part 16 inspects whether products are allocated at proper positions on each shelf and whether the appropriate number of products are allocated on each shelf based on the allocated position of each product registered in the shelf space allocation database stored on the storage unit 21 as well as the minimum number of products. When an insufficient number of products are allocated on each shelf, for example, the allocation status determination part 16 outputs to a display device through the output part 19 a message of "X sets are insufficient in product A".

In the shelf space allocation management system shown in FIG. 3, the surveillance imaging device 105 transmits to the product management device 10 an image capturing the entire status of the floor 100. The status concerning the clerk 106 and the customer 107 is reflected in an image captured by the surveillance imaging device 105. Although a single set of the surveillance imaging device 105 is arranged in a store layout, it is possible to arrange multiple sets of the surveillance imaging device 105 for imaging the entire status of the shelves 101 through 104.

In the product management device 10, the image acquisition part 14 acquires an image captured by the surveillance imaging device 105 so as to transmit the image to the human detector 13. The human detector 13 analyzes images by way of the known image recognition technology so as to identify whether a person reflected in an image is a clerk or a customer and thereby recognize the behavior of a person reflected in an image. In the case of a clerk, for example, his/her facial image is stored on the storage unit 21 in advance, and therefore the human detector 13 compares the facial image of a person reflected in an image with the facial image of a clerk stored on the storage unit 21, thus identifying whether the person matches a clerk. In addition, the human detector 13 may identify a person as a clerk when the costume of a person reflected in an image matches the uniform for a clerk. The human detector 13 identifies a person as a customer when it fails to identify a person reflected in an image as a clerk. Moreover, the human detector 13 is able to recognize the behavior of a person reflected in an image (e.g. activities concerning "a person who extends his/her arm toward a shelf so as to take a product in his/her hand" and "a person who looks around in front of a shelf") by way of the known image recognition technology for detecting movements of persons' arms and variations of facial directions based on a plurality of time-series images.

In the shelf space allocation management system shown in FIG. 3, the register 110 is connected to the product management device 10. The register 110 is equipped with a barcode reader. When the clerk 109 uses a barcode reader to read a barcode printed on a product purchased by the customer 107, the barcode reader acquires and stores a product's identification on a storage unit of the register 110. Herein, the clerk 109 completes reading a barcode on a product and then the customer 107 completes paying the price of a product, and therefore the clerk 109 makes a completion operation with the register 110, which in turn transmits the identification of a product purchased by the customer 107 to the product management device 10.

Triggered by the operation of the clerk 106 and/or the customer 107 reflected in an image captured by the mobile imaging device 108 and/or the surveillance imaging device 105 as well as the identification of a purchased product transmitted from the register 110, the product management device 10 of the present embodiment carries out product allocation inspection when it is assume that any change may occur in the status of allocating products displayed on each shelf.

FIGS. 4A to 4C show examples of data tables stored on the storage unit 21 of the product management device 10 of the present embodiment. Specifically, FIG. 4A shows an example of a product table registered in a product database stored on the storage unit 21. FIG. 4B shows an example of a map information table registered in a map information database stored on the storage unit 21. FIG. 4C shows an example of a shelf space allocation table registered in a shelf space allocation database stored on the storage unit 21.

The product table of FIG. 4A has items such as "Product ID" and "Product Image 1" through "Product Image N". The item of "Product ID" has records concerning identifications of products. The items of "Product Image 1" through "Product Image N" have records concerning images capturing products at various angles. As to the same product, an image capturing its front face may differs from an image capturing its rear face. When a customer takes a product in his/her hand but mistakenly returns the product to a shelf with its rear face turning to its front side, for example, the product management device 10 cannot properly recognize the product if the product table registers an image capturing the front face of the product alone. Therefore, the product table is designed to register multiple images for each product. In this connection, it is unnecessary to register N images for each product.

The map information table of FIG. 4B has items such as "Shelf ID" and "Position Information". The item of "Shelf ID" has records concerning identifications of shelves. The item of "Position Information" has records concerning positional information for each shelf. For example, the positional information represents three-dimensional coordinates for each shelf based on an origin corresponding to a corner of the floor 100. In FIG. 4B, the shelf ID "001" relates to positional information (x,y,z), which represents a position measuring x meters in an x-axis direction, y meters in a y-axis direction, and z meters in a z-axis direction (i.e. a height direction). That is, a shelf having the shelf ID "001" is located at a position representing the positional information (x,y,z) on the floor 100.

The shelf space allocation table of FIG. 4C has items such as "Shelf ID", "Product ID", "Minimum Number", "Current Number", and "Last Check Time". The item of "Shelf ID" has records concerning identifications of shelves while the item of "Product ID" has records concerning identifications of products. The item of "Minimum Number" has records concerning the minimum number of products having "Product ID" allocated on a shelf having "Shelf ID". The item of "Current Number" has records concerning the number of products having "Product ID" currently allocated on a shelf having "Shelf ID". The item of "Last Check Time" has records concerning the last time of making a product allocation inspection with respect to products having "Product ID" allocated on a shelf having "Shelf ID". In this connection, it is possible to register in the shelf space allocation table the information representing which row and which column in a shelf each product should be allocated to.

Figure 5:
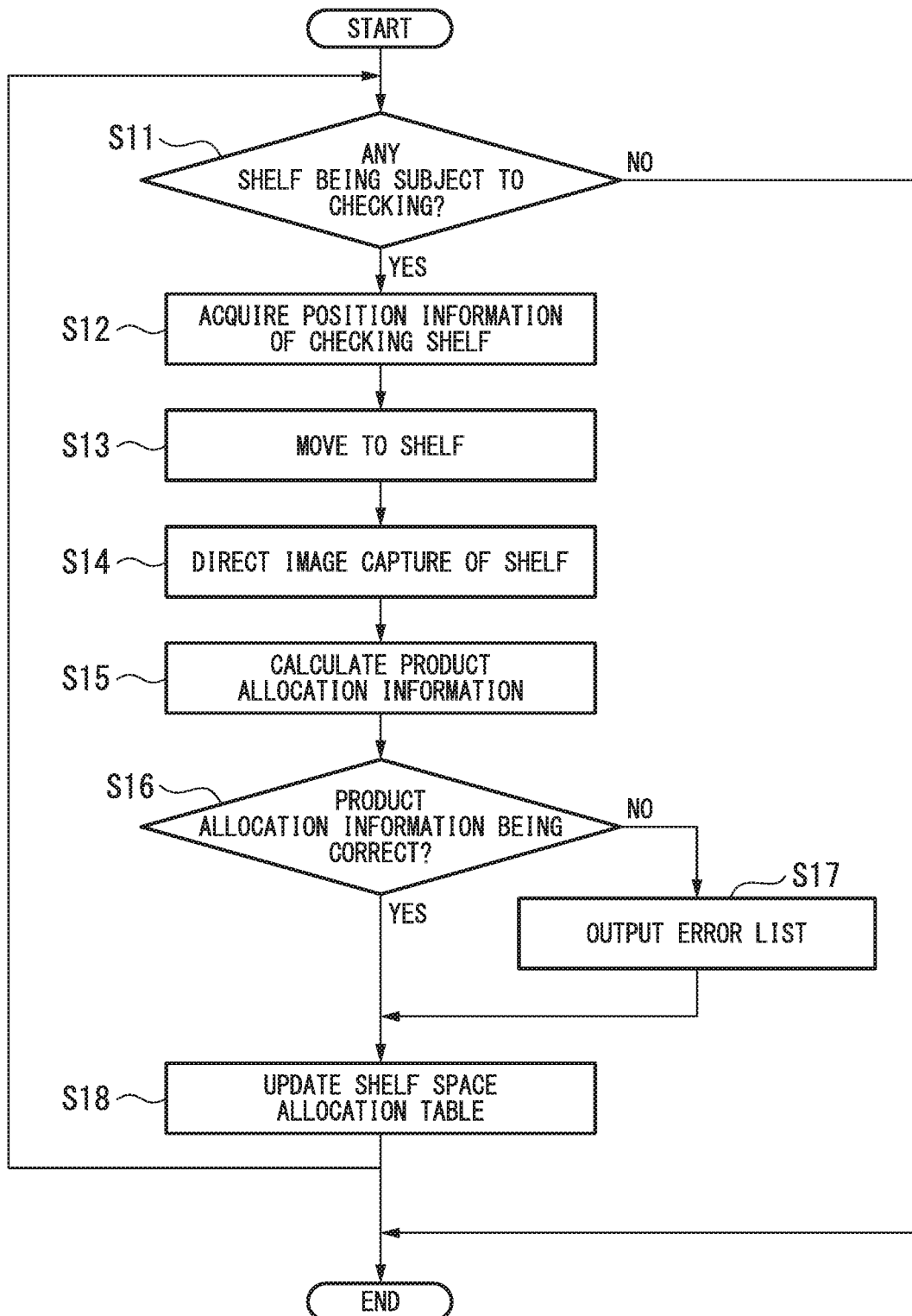
FIG. 5 is a flowchart showing a first procedure for the product management device.

FIG. 5 is a flowchart showing a first procedure for the product management device 10 according to the present embodiment. Specifically, it shows a procedure for the product management device 10 making a product inspection.

First, the execution determination part 18 determines whether or not any one shelf should undergo a product allocation inspection (step S11). Detailed examples of this determination process will be discussed later. The following description refers to the situation that the product management device 10 is scheduled to conduct a product allocation inspection every day at a predetermined time. The execution determination part 18 compares the current time with the start time of a product allocation inspection stored on the storage unit 21 in advance, and therefore it determines that any shelf should undergo a product allocation inspection when the current time matches the start time. The execution determination part 18 exits the flowchart of FIG. 5 when it is determined that no shelf should undergo a product allocation inspection (step S11: NO). In contrast, the execution determination part 18 indicates the commencement of a product allocation inspection with the position specifying part 11 when it is determined that any shelf should undergo a product allocation inspection (step S11: YES).

The position specifying part 11 obtains the positional information of each shelf undergoing a product allocation inspection (step S12). To carry out a product allocation inspection for all shelves, the position specifying part 11 reads from the storage unit 21 identifications (i.e. shelf IDs) of shelves undergoing a product allocation inspection according to an order of inspecting shelves while reading positional information corresponding to each shelf ID from the map information table. The position specifying part 11 sends the positional information corresponding to each shelf ID to the imaging device controller 12 and the allocation status determination part 16.

The imaging device controller 12 moves the mobile imaging device 108 toward a shelf undergoing a product allocation inspection (step S13). The imaging device controller 12 obtains the current positional information of the mobile imaging device 108 by communicating with the mobile imaging device 108 via the communication part 20. The imaging device controller 12 determines a direction of moving the mobile imaging device 108 based on the current positional information of the mobile imaging device 108 and the positional information of a shelf obtained by the position specifying part 11. Next, the imaging device controller 12 generates a command signal for moving the mobile imaging device 108 in its moving direction so as to transmit the command signal to the mobile imaging device 108 via the communication part 20. The imaging device controller 12 repeats the above process until the mobile imaging device 108 reaches an image-capture position close to a shelf undergoing a product allocation inspection.

Next, upon determining that the mobile imaging device 108 reaches an image-capture position, the imaging device controller 12 adjusts the direction of the mobile imaging device 108. For example, it is determined to capture an image of a shelf serving as an image-capture object in its front side. The imaging device controller 12 controls the mobile imaging device 108 to turn its direction by 90° when the position of the mobile imaging device 108 matches the position of a shelf serving as an image-capture object in the x-axis direction and the y-axis direction. Next, the imaging device controller 12 instructs the mobile imaging device 108 to capture an image of a shelf (step S14). The mobile imaging device 108 transmits an image of a shelf to the product management device 10. In the product management device 10, the image acquisition part 14 obtains an image captured by the mobile imaging device 12 via the communication part 20. Next, the product recognition part 15 calculates product allocation information (step S15). The product allocation information represents which product is displayed on a shelf and the number of products allocated on a shelf. For example, the product recognition part 15 compares an image captured by the image acquisition part 14 with images of various products registered in the product table so as to specify an image of product having features closest to a captured image as a product reflected in the captured image. In addition, the product recognition part 15 detects the number of specified products being reflected in the captured image by way of image recognition. Moreover, the product recognition part 15 may detect which row and which column in a shelf the specified product is allocated to by way of image recognition.

Next, the product recognition part 15 sends to the allocation status determination part 16 the identification of the specified product (i.e. a product ID) and product allocation information of products (e.g. the number of products) reflected in the captured image. Herein, it is possible to register images representing various orientations of each product in the product table in advance, thus conducting pattern matching between features of each product image and features of each captured image. In this case, the product recognition part 15 may estimate an allocated orientation of the specified product (e.g. a vertical/horizontal orientation of each product, a backward orientation of each product), thus sending to the allocation status determination part 16 the information concerning an allocated orientation of each product in addition to product IDs, the number of products, and the number of arrays for products.

The allocation status determination part 16 determines whether or not products are arranged on each shelf in a proper status of allocation (step S16). For example, the allocation status determination part 16 refers to the shelf space allocation table based on a product ID obtained from the product recognition part 15 and a shelf ID obtained from the position specifying part 11, thus reading the minimum number of products which is determined for each combination of the product ID and the shelf ID. Subsequently, the allocation status determination part 16 compares the minimum number of products with the number of products that the product recognition part 15 obtains via image recognition. The allocation status determination part 16 determines that products are arranged in a proper status of allocation when the number of products is equal to or greater than the minimum number of products. In contrast, it determines that products are arranged in an improper status of allocation when the number of products is less than the minimum number of products. In some situation, the product recognition part 15 may detect multiple types of products obtained via image recognition (i.e. it may detect multiple product IDs). When the allocation status determination part 16 refers to the shelf space allocation table based on a shelf ID and a certain product ID among multiple product IDs but it fails to find out the corresponding records in the product allocation table, it is assumed that products representing a certain product ID should not be arranged on a shelf representing the shelf ID. In this case, the allocation status determination part 16 determines that products are arranged in an improper status of allocation.

The above shelf space allocation table may prescribe numeric values representing the number of rows and the number of columns for allocating products on each shelf. Herein, the allocation status determination part 16 may determine that products are arranged in an improper status of allocation when the number of rows and the number of columns for allocating products on each shelf obtained via image recognition differ from the numeric values registered in the shelf space allocation table. When the product recognition part 15 obtains an allocated orientation of each product, for example, when each product is allocated in a backward orientation, the allocation status determination part 16 may determine that products are arranged in an improper status of allocation. In addition, the allocation status determination part 16 may determine whether a tag of each product is placed at an appropriate position in addition to the allocation status of each product. For example, the product recognition part 15 calculates the position and the inclination of each product tag via image recognition, and then the allocation status determination part 16 compares them with the positional information for placing each product tag so as to determine whether each product tag is placed in a proper manner.

Upon determining a proper status of allocating products (step S16: NO), the allocation status determination part 16 sends information concerning the cause of improperness determination to the output part 19. For example, the information concerning the cause of improperness determination may refer to "Shelf ID: 001, Product ID: A, Insufficient Number: Two". The output part 19 outputs an error list describing a shelf having a problem in a product allocation status based on the information concerning the cause of improper determination for a product allocation status. The clerk 106 may approach a shelf described on an error list so as to supplement products or appropriately reorganize products.

When the allocation status determination part 16 determines that products are arranged in a proper status of allocation (step S16: YES), or when the output part 19 outputs an error list, the allocation status determination part 16 updates the numeric value assigned to the item of "Current Number" for a record relating to the product ID and the shelf ID described in the shelf space allocation table with the number of products obtained from the product recognition part 15. In addition, the allocation status determination part 16 updates the numeric value assigned to the item of "Last Check Time" for a record of the shelf space allocation table with the current time (step S18). Thereafter, the flow returns to step S11, and therefore the aforementioned processes are repeated as long as any shelf remains to undergo a product allocation inspection.

The shelf space allocation management system of the present embodiment is able to automatically carry out a product allocation inspection without spending time and effort by store clerks manually capturing images of products displayed on shelves and attaching RFID tags to products. In addition, the present embodiment can be realized using an unmanned helicopter having an imaging device which is sold in market. In this connection, it is possible to provide multiple types of products subjected to recognition for product allocation in step S15.

The procedure of FIG. 5 has been described such that shelves are subjected to product allocation inspection at a predetermined time in a predetermined order. However, the shelf space allocation management system of the present embodiment is able to specify the position of each shelf undergoing the occurrence of any change upon assuming the occurrence of any change in product allocation status so as to carry out a product allocation inspection for the shelf located at the specified position. Next, processing realizing this function will be described in detail with reference to FIGS. 6 to 11.

Figure 6:
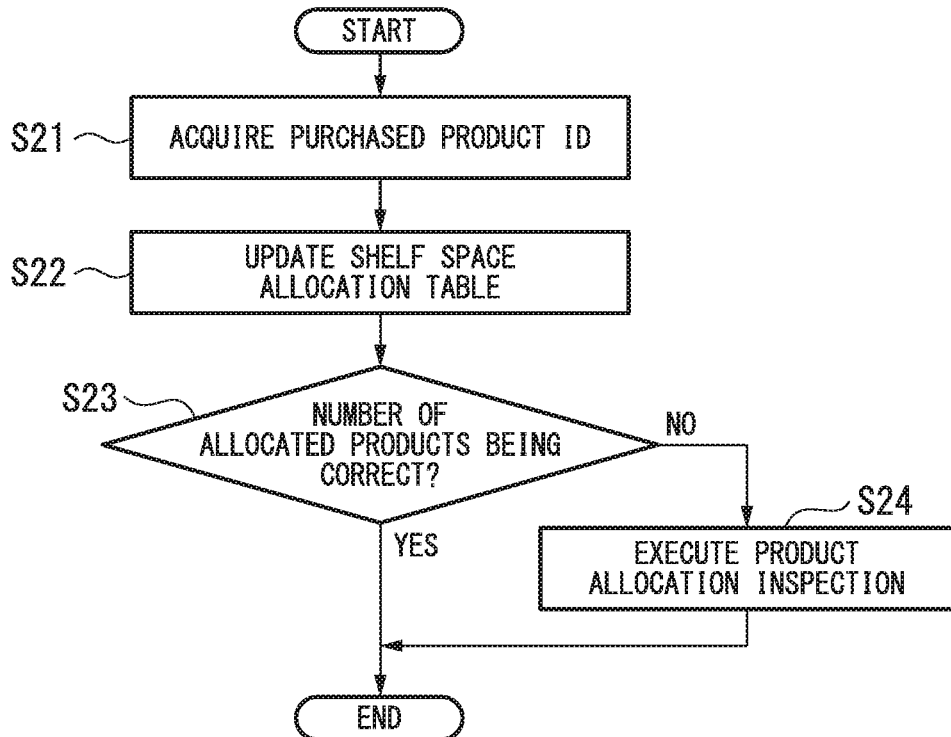
FIG. 6 is a flowchart showing a second procedure for the product management device.

FIG. 6 is a flowchart showing a second procedure for the product management device 10. In the second procedure, the execution determination part 18 determines whether to carry out a product allocation inspection when a customer purchases a product to as to change the status of allocating products on each shelf.

In FIG. 3, the customer 107 purchases any product to pay the price thereof, and therefore the clerk 109 reads product information with a barcode reader so as to carry out an input process, and then the register 110 transmits to the product management device 10 a product ID of the purchased product and the number of products being purchased. In the product management device 10, the product purchase information acquisition part 17 acquires the product ID via the communication part 20 (step S21). The product purchase information acquisition part 17 refers to the shelf space allocation table based on the product ID so as to update the numeric value registered as a record of the item "Current Number" concerning the product ID with a value subtracting the number of products being purchased (step S22). When plenty of articles corresponding to the same product are distributed and displayed on a plurality of shelves, the product purchase information acquisition part 17 carries out an update process for subtracting the number of purchased products from the numeric value registered in the item "Current Number" with respect to all the records concerning the same "Product ID" in the shelf space allocation table.

After the product purchase information acquisition part 17 updates the numeric value of the item "Current Number" concerning the "Product ID" of the purchased product in the shelf space allocation table, the allocation status determination part 16 determines the properness of the allocation status of each product (step S23). Specifically, the allocation status determination part 16 compares the numeric value of the item "Minimum Number" with the numeric value of the item "Current Number", and therefore it determines that the product allocation status is improper when the numeric value of the item "Current Number" is less than the numeric value of the item "Minimum Number". When plenty of articles corresponding to the same product are distributed and displayed on a plurality of shelves, the allocation status determination part 16 determines the properness of the allocation status of each product with respect to all records concerning the same "Product ID" in the shelf space allocation table. The allocation status determination part 16 determines that the allocation status of each product is proper when the numeric value of the item "Current Number" after subtracting the number of purchased products in all records concerning the same "Product ID" is equal to or greater than the numeric value of the item "Minimum Number". On the other hand, the allocation status determination part 16 determines that the allocation status of each product is improper when one of all records concerning the same "Product ID" is deemed to be improper in its allocation status. The allocation status determination part 16 notifies the determination result of the allocation status of each product to the execution determination part 18.

Upon determining the properness of the allocation status of each product (step S23: YES), the execution determination part 18 exits the procedure of FIG. 6 without carrying out a product allocation inspection. Upon determining the improperness of the allocation status of each product (step S23: NO), the execution determination part 18 executes a product allocation inspection (step S24). After completion of step S24, the present embodiment proceeds to a series of steps from step S12 in FIG. 5. Specifically, the execution determination part 18 indicates the commencement of product allocation inspection with the position specifying part 11. The allocation status determination part 16 reads a shelf ID of a shelf displaying product purchased by a customer from the shelf space allocation table so as to notify it to the position specifying part 11. The position specifying part 11 reads positional information of the shelf having the shelf ID from the map information table so as to send it to the imaging device controller 12 and the allocation status determination part 16. Next, the imaging device controller 12 instructs the mobile imaging device 108 to move toward the shelf having the shelf ID so as to capture an image. When plenty of articles corresponding to the product purchased by a customer are distributed and displayed on a plurality of shelves, the mobile imaging device 108 captures images for all the multiple shelves. Next, the product recognition part 15 specifies each product via image recognition so as to count the number of products displayed on each shelf. In addition, the allocation status determination part 16 determines the status of allocating products so as to update the shelf space allocation table.

According to the procedure of FIG. 6, the product management device 10 carries out a product allocation inspection solely for a shelf displaying the purchased product upon assuming the occurrence of any change in allocation status of each product when a customer purchases each product. Thus, it is possible to efficiently carry out a product allocation inspection in real time.

Figure 7:
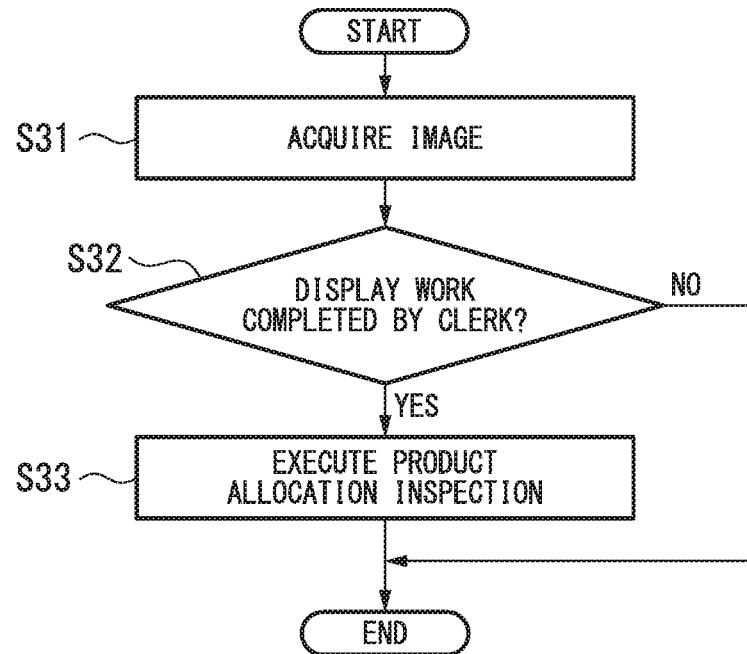
FIG. 7 is a flowchart showing a third procedure for the product management device.

FIG. 7 is a flowchart showing a third procedure for the product management device 10. In FIG. 7, the execution determination part 18 carries out a product allocation inspection when any change occurs in allocation status of each product due to the clerk 106 displaying products on shelves. The procedure of FIG. 7 is based on the precondition that the mobile imaging device 108 having an automatic tracking mode moves behind the clerk 106 who displays products on shelves. In addition, the mobile imaging device 108 is continuously capturing images in its moving direction under an image-capture instruction from the imaging device controller 12 of the product management device 10. Moreover, the imaging device controller 12 is able to acquire positional information of the mobile imaging device 108 at a predetermined interval of time.

First, the image acquisition part 14 of the product management device 10 acquires images captured by the mobile imaging device 108 (step S31). The image acquisition part 14 sends images to the human detector 13. The human detector 13 detects the behavior of the clerk 106 reflected in multiple images captured by the image acquisition part 14 in time series. For example, the human detector 13 detects whether the clerk 106 is moving along a path between shelves in a store, whether the clerk 106 visually recognizes products displayed on shelves, and whether the clerk 106 extends his/her arm towards shelves. In this connection, features of the clerk 106 (e.g. facial images and features of clothes) are stored on the storage unit 21 in advance, and therefore human detector 13 is able to identify the clerk 106 and the customer 107. The human detector 13 sends the behavior of the clerk 106 to the execution determination part 18.

The execution determination part 18 determines whether the clerk 106 displays products on shelves (step S32). For example, the execution determination part 18 determines that the clerk 106 displays products based on multiple images captured by the image acquisition part 14 in time series when the clerk 106 repeatedly extends his/her arms a predetermined number of times or more in a predetermined period of time. The product management device 10 exits the procedure of FIG. 7 (step S33) when it is determined that the clerk 106 does not display products (step S32: YES). Specifically, the execution determination part 18 indicates the commencement of a product allocation inspection with the position specifying part 11. The position specifying part 11 acquires the positional information of the mobile imaging device 108 from the imaging device controller 12. The position specifying part 11 sends the positional information to the allocation status determination part 16. The procedure of FIG. 7 is based on the precondition that the mobile imaging device 108 is following behind the clerk 106, and therefore the mobile imaging device 108 should have already moved close to a shelf to be inspected. Therefore, the imaging device controller 12 changes the mode of the mobile imaging device 108 from an automatic tracking mode to a position control mode, thus controlling the mobile imaging device 108 to capture images of shelves, which should be checked in allocation status of each product, in terms of the positioning and the image-capture direction. After completion of step S33, the product management device 10 carries out a series of steps similar to the foregoing steps from step S12 onwards in FIG. 5.

According to the third procedure, when it is assumed that any change occurs in the status of allocating products on a shelf due to a clerk displaying products on a shelf in a store, the execution determination part 18 carries out a product allocation inspection solely for the shelf having arranged products. Thus, it is possible to confirm whether a clerk appropriately displays products on shelves after the clerk complete displaying products on shelves.

Figure 8:
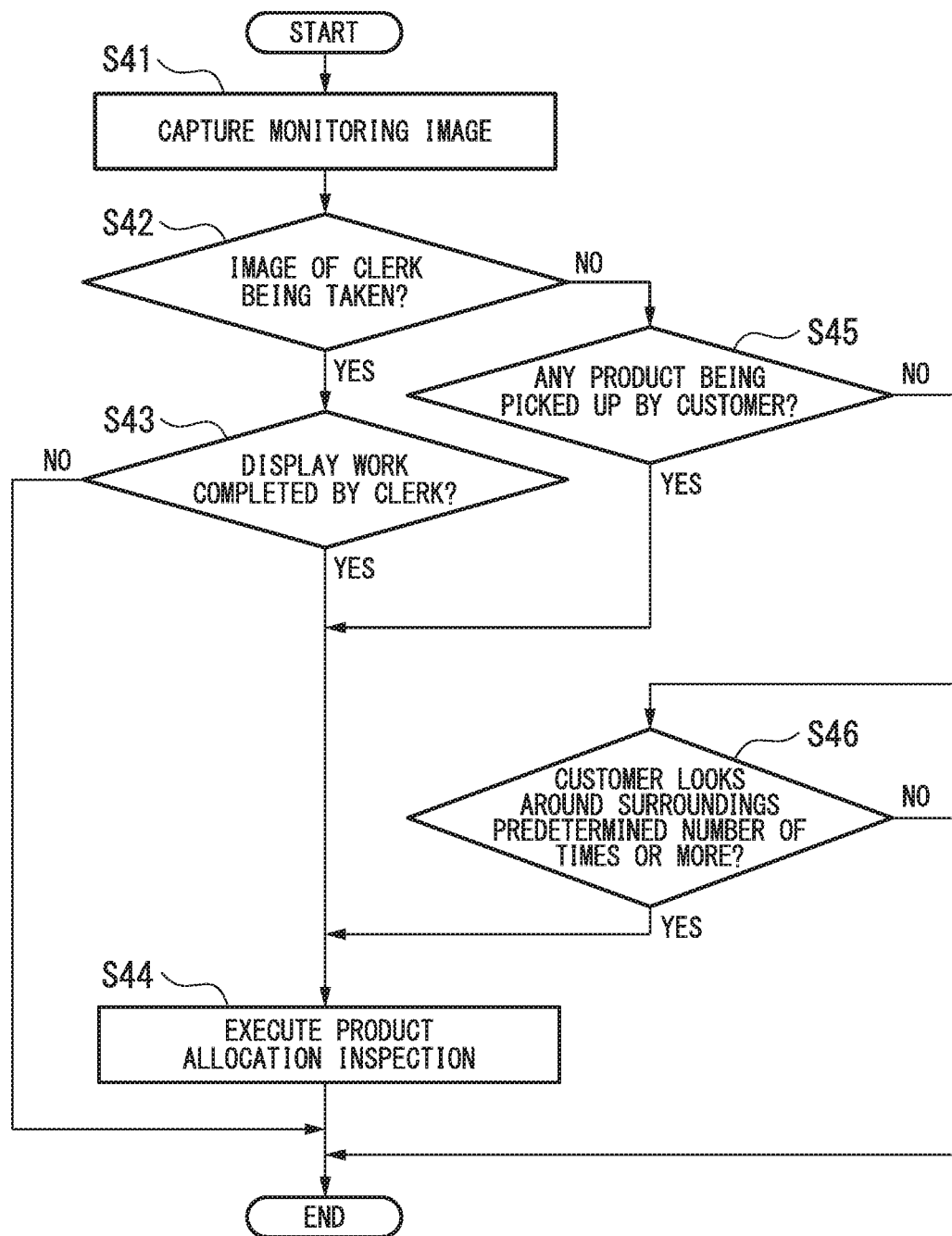
FIG. 8 is a flowchart showing a fourth procedure for the product management device.

FIG. 8 is a flowchart showing a fourth procedure for the product management device 10. In FIG. 8, the execution determination part 18 determines to execute a product allocation inspection when a clerk or a customer moves products on shelves so as to change the status of allocating products. The third procedure of FIG. 7 is based on the precondition that the mobile imaging device 108 follows behind the clerk 106 who displays products on shelves. On the other hand, the fourth procedure of FIG. 8 is carried out upon detecting any change in allocation status of each product due to the clerk 106 or the customer 107 based on images captured by the surveillance imaging device 105 instead of images captured by the mobile imaging device 108.

First, the image acquisition part 14 of the product management device 10 acquires images captured by the surveillance imaging device 105 (step S41). The image acquisition part 14 sends images to the human detector 13. Next, the human detector 13 recognizes a person reflected in images so as to identify whether the person is clerk 106 or the customer 107 (step S42). For example, an image of the uniform worn by the clerk 106 is stored on the storage unit 21 in advance, and therefore the human detector 13 determines whether clothes of a person reflected in an image matches the uniform of the clerk 106 via pattern matching. The human detector 13 identifies the person as the clerk 106 when the person's clothes reflected in an image matches the uniform. On the other hand, the human detector 13 identifies the person as the customer 107 when the person's clothes reflected in an image doses not match the uniform. When a facial image of the clerk 106 is stored on the storage unit 21 in advance, the human detector 13 may identify whether a person reflected in an image is the clerk 106 by way of the facial recognition technology. Upon identifying a person reflected in an image as the clerk 106 (step S42: YES), the human detector 13 detects the behavior of the clerk 106 from multiple images captured by the image acquisition part 14 in time series so as to notify it to the execution determination part 18. Similar to step S32 of FIG. 7, the execution determination part 18 determines whether or not the clerk 106 displays products on shelves (step S43). Upon determining that the clerk 106 or the customer 107 displays products on shelves (step S43: YES), the execution determination part 18 executes a product allocation inspection (step S44). Upon detecting that the clerk 106 does not display products on shelves (step S43: NO), the product management device 10 exits the procedure of FIG. 8.

Upon identifying a person reflected in an image as the customer 107 in step S42 (step S42: NO), the human detector 13 detects the behavior of the customer 107 via image recognition. For example, the human detector 13 detects any change in behavior or attitude of the customer 107 reflected in multiple time-series images obtained from the image acquisition part 14. That is, the human detector 13 detects whether the customer 107 is moving along a path between shelves, whether the customer 107 turns to a shelf, whether the customer 107 takes a product in his/her hand, or whether the customer 107 looks around in front of shelves. The human detector 13 detects the operation of the customer 107 so as to notify it to the execution determination part 18. In addition, the human detector 13 detects the position of the clerk 106 or the customer 107 reflected in an image. For example, the human detector 13 detects the positional information of the customer 107 as "Customer 107, before Shelf ID=001".

Next, the execution determination part 18 determines whether the customer 107 takes a product in his/her hand (step S45). For example, the execution determination part 18 determines that the customer 107 takes a product in his/her hand when the human detector 13 notifies the execution determination part 18 of the operation of the customer 107 taking a product in his/her hand. Upon determining that the customer 107 takes a product in his/her hand (step S45: YES), the execution determination part 18 executes a product allocation inspection (step S44: YES). Upon determining that the customer 107 does not take any product in his/her hand (step S45: NO), the execution determination part 18 determines whether the customer 107 looks around in front of a shelf a predetermined number of times or more (step S46). For example, when the human detector 13 notifies that the customer 107 looks around in front of a shelf while the customer 107 repeatedly makes his/her movements a predetermined number of times or more, the execution determination part 18 determines that the customer 107 looks around his/her surroundings in front of a shelf a predetermined number of times or more. Upon determining that the customer 107 does not look around his/her surroundings (step S46: NO), the execution determination part 18 exits the procedure of FIG. 8. On the other hand, upon determining that the customer 107 looks around his/her surroundings (step S46: YES), the execution determination part 18 executes a product allocation inspection. Specifically, the execution determination part 18 indicates the commencement of a product allocation inspection with the position specifying part 11. The position specifying part 11 obtains information detected by the human detector 13. The position specifying part 11 specifies a shelf ID of a shelf subjected to product allocation inspection based on the detected information of the human detector 13 so as to read positional information concerning the shelf ID from the map information table. Next, the position specifying part 11 sends the positional information to the allocation status determination part 16 of the imaging device controller 12. After completion of step S44, the product management device 10 carries out a series of steps from step S12 onwards in FIG. 5.

It is assumed that the customer 107 may have a possibility of purchasing a product when the operation of the customer 107 taking the product in his/her hand is reflected in an image captured by the surveillance imaging device 105. According to the procedure of FIG. 8 in which the product management device 10 does not cooperate with the register 110, it is possible to execute a product allocation inspection being triggered by the customer 107 purchasing any product even when the product purchase information acquisition part 17 fails to acquire product purchase information.

It is assumed that a clerk may have a possibility of displaying products on shelves when the operation of a clerk repeatedly extending his/her arms towards shelves is reflected in images captured by the surveillance imaging device 105. Although a clerk other than the clerk 106 followed by the mobile imaging device 108 displays products on shelves at another location, it is possible to carry out a product allocation inspection being triggered by detecting the other clerk's displaying products on shelves.

Even when a customer taking a product in his/her hand is not reflected in images captured by the surveillance imaging device 105 depending on its installation position in a store, it is assumed that the customer has a possibility of conducting shoplifting when the customer frequently looks around his/her surroundings in front of a shelf. According to the procedure of FIG. 8, it is possible to confirm whether any product has been actually taken away from shelves by carrying out a product allocation inspection upon detecting a questionable behavior of a customer.

In this connection, it is possible to add a decision as to "whether a customer extends his/her arm towards a shelf" after step S46 denoting a decision as to "whether a customer looks around a predetermined number of times or more". That is, it is possible to carry out a product allocation inspection of step S44 upon assuming a possibility of shoplifting only when a customer extends his/her arm toward a shelf after looking around his/her surroundings. In addition, it is possible to carry out collation of personal characters when facial images of persons conducting shoplifting in the past have been registered in a database in advance. In this case, it is possible to carry out the process of step S46 only when a person's facial image matches any one of persons' facial images registered in a database.

Next, other methods for assuming the occurrence of any change in the status of allocating products on shelves will be described with reference to FIG. 9A. 9B, and FIG. 10. FIGS. 9A and 9B show examples of data tables stored on the storage unit 21 being referred by the product management device 10. Specifically, FIG. 9A shows a product inspection frequency table while FIG. 9B shows a shelf inspection frequency table.

The product inspection frequency table of FIG. 9A has items of "Product ID" and "Frequency". The item "Product ID" has records concerning identifications of products. The item "Frequency" has records concerning periods for performing a product allocation inspection for each product. For example, the product inspection frequency table describes that a product allocation inspection is carried out at the frequency of every hour with respect to the well-sold product A. In addition, the product inspection frequency table describes that a product allocation inspection is carried out at the frequency of every twenty-four hours or every seventy-two hours depending on sales conditions (or sales) with respect to products B and C.

The shelf inspection frequency table of FIG. 9B has items of "Shelf ID" and "Frequency". The item "Shelf ID" has records concerning identifications of shelves. The item "Frequency" has records concerning periods for making a product allocation inspection for each shelf. For example, the shelf inspection frequency table describes that a product allocation inspection is carried out at the frequency of every hour with respect to a shelf having a shelf ID of "001" displaying well-sold products. In addition, the shelf inspection frequency table describes that a product allocation inspection is carried out at the frequency of every twenty-four hours or every seventy-two hours, depending on sales conditions of products displayed on shelves having shelf IDs "002" and "003".

Figure 10:
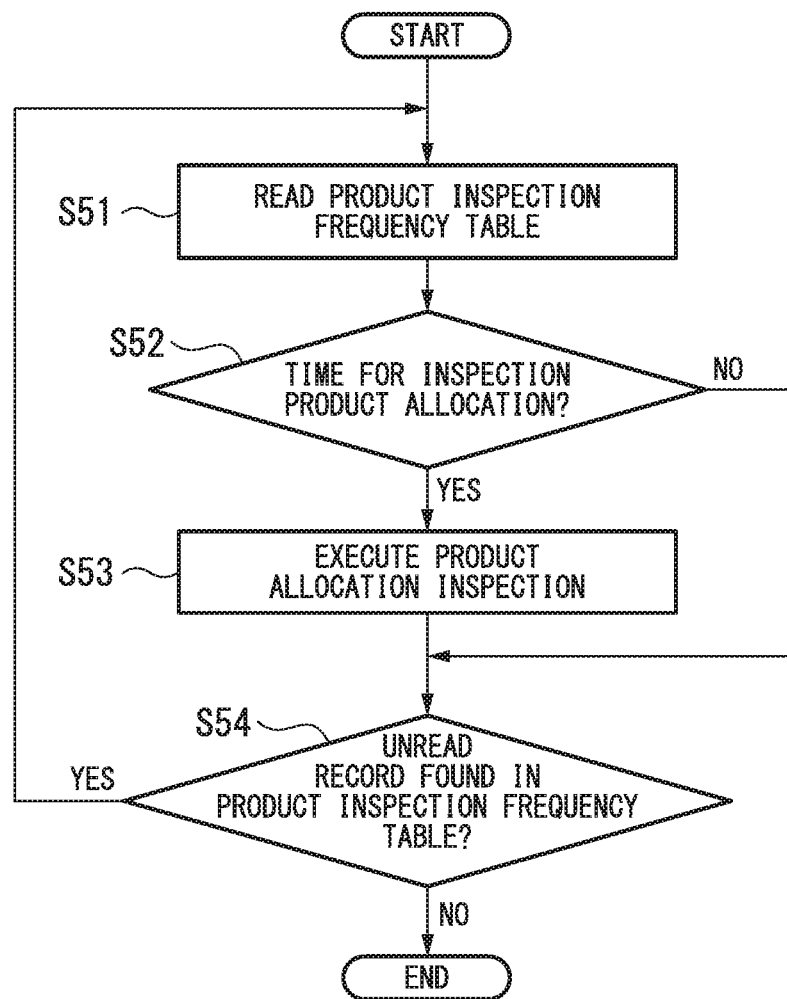
FIG. 10 is a flowchart showing a fifth procedure for the product management device.

FIG. 10 is a flowchart showing a fifth procedure for the product management device 10. In FIG. 10, the product management device 10 carries out a product allocation inspection based on the frequency for checking products or shelves depending on sales conditions of products or sold conditions of products on shelves.

First, the execution determination part 18 reads one record from the product inspection frequency table of the storage unit 21 at a predetermined interval of time (step S51). The execution determination part 18 reads a last check time, concerning a product ID for the read record, from the product allocation table. The execution determination part 18 adds to the last check time concerning the product ID the numerical value assigned to the item "Frequency" read from the product inspection frequency table. When the item "Frequency" of the product inspection frequency table describes "Every Hour", for example, one hour is added to the last check time.

Next, the execution determination part 18 determines whether the current time matches the time for carrying out a product allocation inspection (step S52). Specifically, the execution determination part 18 compares the current time with the numeric value (i.e. addition time) that is produced by adding the numeric value of the item "Frequency" to the last check time. When the current time passes the addition time, the execution determination part 18 determines that it comes to the time for carrying out a product allocation inspection. Upon determining the time for carrying out a product allocation inspection (step S52: YES), the execution determination part 18 carries out a product allocation inspection (step S53). The position specifying part 11 reads a shelf ID for executing a product allocation inspection with reference to the shelf space allocation table based on the product ID, and then it reads positional information concerning the shelf ID from the map information table. After completion of step S53, the product management device 10 carries out a series of steps from step S12 onwards in FIG. 5.

Next, the execution determination part 18 determines whether any unread record is found in the product inspection frequency table (step S54). When it is determined that any unread record is found in the product inspection frequency table (step S54: YES), the execution determination part 18 returns to step S51 so as to read a new record. Thereafter, the execution determination part 18 repeatedly carries out a series of steps from step S52 onwards. When no unread record is found in the product inspection frequency table (step S54: NO), the execution determination part 18 exits the procedure of FIG. 10.

According to the procedure of FIG. 10, it is possible to determine the timing of causing any change in allocation status of each product depending on sales performance of products in advance, thus carrying out a product allocation inspection at the timing. This makes it possible to efficiently confirm an allocation of products. In FIG. 10, the execution determination part 18 determines whether to carry out a product allocation inspection with reference to the product inspection frequency table; but this is not a restriction. To carry out a process for allocating products depending on sales performance of products, it is possible to carry out a product allocation inspection by executing the same procedure of FIG. 10 with reference to the shelf inspection frequency table instead of the product inspection frequency table.

Figure 11:
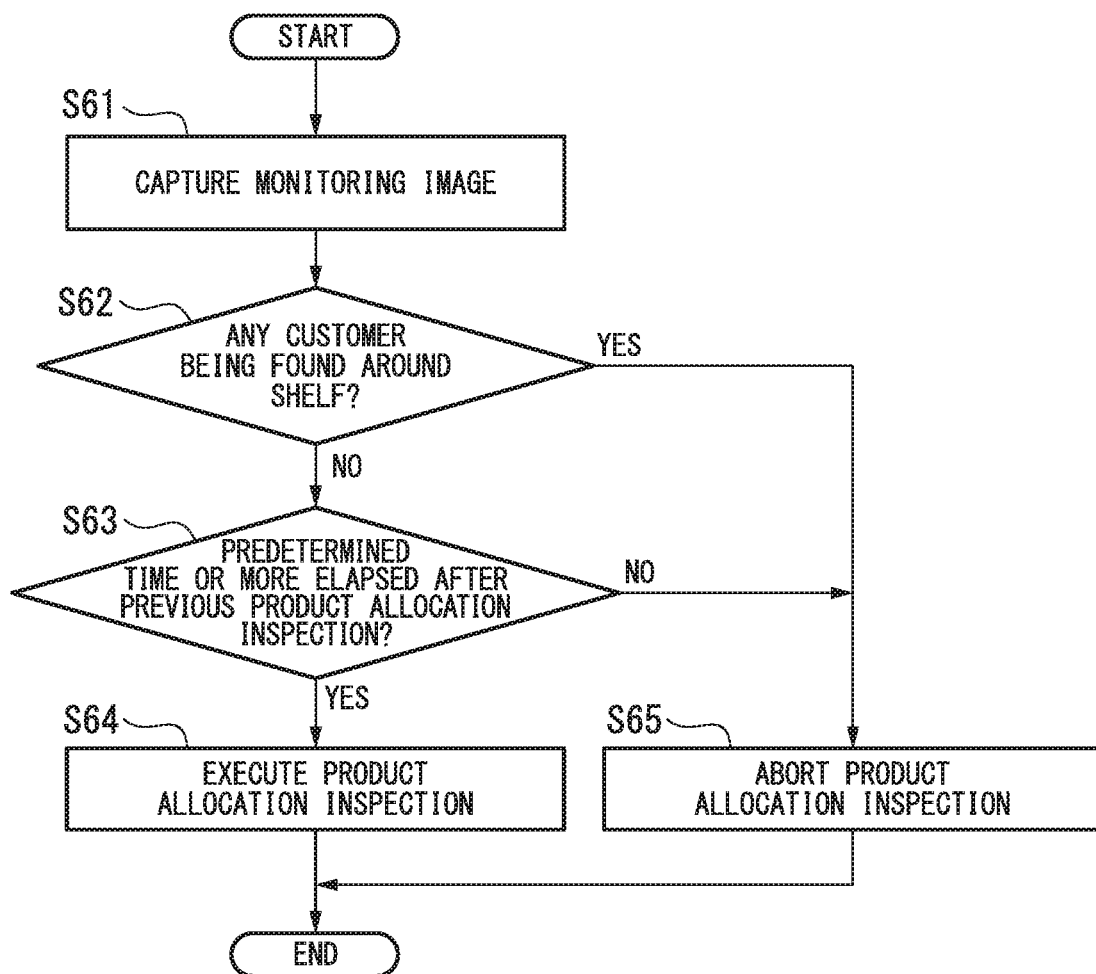
FIG. 11 is a flowchart showing a sixth procedure for the product management device.

FIG. 11 is a flowchart showing a sixth procedure for the product management device 10. FIG. 11 shows conditions that are incidentally considered before determining whether to execute a product allocation inspection with the execution determination part 18. In the precondition for the explanation of FIG. 11, the execution determination part 18 has already determined to carry out a product allocation inspection for a certain shelf.

First, the image acquisition part 14 acquires images captured by surveillance imaging device 105 (step S61). The image acquisition part 14 sends images to the human detector 13. The human detector 13 detects all the positions indicating possible existence of customers in images via image recognition. The human detector 13 sends positional information to the execution determination part 18.

The execution determination part 18 compares the positional information acquired from the human detector 13 with the positional information concerning a shelf ID of a shelf specified by the position specifying part 11 so as to determine whether any customer is found in proximity to a shelf subjected to product allocation inspection (step S62). When any customer is found in proximity to a shelf (step S62: YES), the execution determination part 18 proceeds to step S65. When no customer is found in proximity to the shelf (step S62: NO), the execution determination part 18 determines whether a predetermined time or more has elapsed after the previous timing of executing a product allocation inspection with respect to the shelf subjected to product allocation inspection (step S63). Specifically, the execution determination part 18 compares the current time with the time (i.e. the addition time) that is produced by adding the predetermined time to the last check time for a record concerning the shelf ID in the shelf space allocation table, and therefore it determines that the predetermined time or more has passed the previous timing of executing a product allocation inspection when the current time is equal to or greater than the addition time (step S63: YES). Thereafter, the execution determination part 18 executes a product allocation inspection (step S64). On the other hand, when the execution determination part 18 determines that the predetermined time or more has passed the previous timing of executing a product allocation inspection since the current time is smaller than the addition time (step S63: NO), the execution determination part 18 stops executing a product allocation inspection (step S65).

According to the procedure of FIG. 11, it is possible to stop executing a product allocation inspection when any customer is found in proximity to a shelf, and therefore it is possible to prevent an event that the mobile imaging device 108 moving around each customer may disturb each customer from selecting products or an event of invading a customer's privacy by mistakenly capturing an image of each customer. In addition, it is possible for the present embodiment to suspend a further product allocation inspection for a predetermined time with respect to a shelf that has been already subjected to product allocation inspection once. For this reason, it is possible to prevent a product allocation inspection from being repeatedly executed at more than the necessary frequency with respect to the same shelf. In FIG. 11, it is unnecessary to execute both the decision of step S11 and the decision of step S63; hence, it is possible to execute one of those steps.

The foregoing embodiment is explained using an unmanned air vehicle as the mobile imaging device 108; but this is not a restriction. For example, it is possible to facilitate rails on the ceiling or the floor 100 of a store so that the mobile imaging device 108 can move along the rails. That is, it is possible to install in the shelf space allocation management system any transportation means that enables the mobile imaging device 108 to move in a store.

The aforementioned product management device 10 includes a computer system therein. In addition, the product management device 10 implements processes using programs stored on computer-readable storage media. That is, the computer system loads and executes programs to achieve the foregoing processes. Herein, the computer-readable storage media refer to magnetic disks, magneto-optical disks, CD-ROM, DVD-ROM, semiconductor memory and the like. In addition, it is possible to deliver programs to computers through communication lines, and therefore computers may execute programs.

The foregoing programs may achieve part of the foregoing functions. Alternatively, the foregoing programs may be differential files (or differential programs) that can achieve the foregoing functions by being combined with pre-installed programs in computer system. In FIG. 3, the floor 100 shows an example of an area arranging shelves in a store while an image captured by the surveillance imaging device 105 shows an example of an image monitoring the internal state of a store.

INDUSTRIAL APPLICABILITY

The present invention provides a shelf space allocation management system that automatically executes product allocation inspection for products displayed on shelves in a store at an appropriate timing; however, its applications should not be limited to products. For example, the present invention is applicable to any types of systems that may manage electronic parts and materials allocated on multiple shelves.

REFERENCE SIGNS LIST 10 product management device
11 position specifying part
12 imaging device controller
13 human detector
14 image acquisition part
15 product recognition part
16 allocation status determination part
17 product purchase information acquisition part
18 execution determination part
19 output part
20 communication part
21 storage unit
100 floor
101-104 shelf
105 surveillance imaging device
106, 109 clerk
107 customer
108 mobile imaging device
110 register

The invention claimed is:

1. A shelf space allocation management device for managing a plurality of products allocated on a shelf among a plurality of shelves using a mobile imaging device movable in a store, the shelf space allocation management device comprising:
a memory storing instructions; and
a processor coupled to the memory and configured to execute the instructions to:
acquire a first image taken by the mobile imaging device configured to move in a store under an automatic tracking mode configured to track a clerk;
determine whether the clerk located in the store and captured in the first image has performed a predetermined action on the shelf;
specify position information of the shelf for a product allocation inspection, wherein the position information is assumed to be changed in product allocation due to the predetermined action on the shelf;
change the automatic tracking mode to a position control mode directing movement according to position information of the mobile imaging device and a target position determined in advance after specifying the position information of the shelf;
move a drone having the mobile imaging device and configured to automatically track a person located in the store to an image-capture position in a direction calculated according to the position information of the shelf in the position control mode;
adjust the direction of the mobile imaging device upon determining that the mobile imaging device arrives at the image-capture position in the position control mode;
control the mobile imaging device to capture a second image on the shelf at the image-capture position;
determine whether a type and an allocation status of a plurality of products reflected in the second image match a predetermined type and a predetermined allocation status of the plurality of products; and
execute the product allocation inspection based on a determination result of the type and the allocation status of the product.

2. The shelf space allocation management device according to claim 1, wherein
the predetermined action is determined using a third image of the person captured by a secondary imaging device fixed at a predetermined position in the store as to whether the person has displayed the product on the shelf.

3. The shelf space allocation management device according to claim 1, wherein
the predetermined action is determined using a third image of the person captured by a secondary imaging device fixed at a predetermined position in the store as to whether the person has repeatedly extended an arm toward at least one of the plurality of products on the shelf a predetermined number of times in a predetermined period of time.

4. The shelf space allocation management device according to claim 1, wherein the processor is further configured to execute the product allocation inspection in a first time interval which is determined for each product among the plurality of products in advance or in a second time interval which is determined for each shelf among the plurality of shelves in advance.

5. The shelf space allocation management device according to claim 1, wherein the processor is further configured to estimate an allocated orientation of each product, wherein the allocated orientation comprises at least one of a vertical or horizontal orientation of each product or a backward or forward orientation of each product.

6. The shelf space allocation management device according to claim 1, wherein the processor is further configured to determine that the allocation status of the plurality of products matches the predetermined allocation status of the plurality of products when a number of products reflected in the second image is greater than or equal to a predetermined number of products.

7. A shelf space allocation management method for managing a plurality of products allocated on a shelf among a plurality of shelves using a mobile imaging device movable in a store, the shelf space allocation management method comprising:
acquiring a first image taken by the mobile imaging device configured to move in a store under an automatic tracking mode configured to track a clerk;
determining whether the clerk located in the store and captured in the first image has performed a predetermined action on the shelf;
specifying position information of the shelf for a product allocation inspection, wherein the position information is assumed to be changed in product allocation due to the predetermined action on the shelf;
changing the automatic tracking mode to a position control mode directing movement according to position information of the mobile imaging device and a target position determined in advance after specifying the position information of the shelf;
moving a drone having the mobile imaging device and configured to automatically track a person located in the store to an image-capture position in a direction calculated according to the position information of the shelf in the position control mode;
adjusting the direction of the mobile imaging device upon determining that the mobile imaging device arrives at the image-capture position in the position control mode;
controlling the mobile imaging device to capture a second image on the shelf at the image-capture position;
determining whether a type and an allocation status of a plurality of products reflected in the second image match a predetermined type and a predetermined allocation status of the plurality of products; and
executing the product allocation inspection based on a determination result of the type and the allocation status of the product.

8. The shelf space allocation management method according to claim 7, wherein
the predetermined action is determined using a third image of the person captured by a secondary imaging device fixed at a predetermined position in the store as to whether the person has displayed the product on the shelf.

9. The shelf space allocation management method according to claim 7, wherein
the predetermined action is determined using a third image of the person captured by a secondary imaging device fixed at a predetermined position in the store as to whether the person has repeatedly extended an arm toward at least one of the plurality of products on the shelf a predetermined number of times in a predetermined period of time.

10. The shelf space allocation management method according to claim 7, further comprising executing the product allocation inspection in a first time interval which is determined for each product among the plurality of products in advance or in a second time interval which is determined for each shelf among the plurality of shelves in advance.

11. The shelf space allocation management method according to claim 7, further comprising estimating an allocated orientation of each product, wherein the allocated orientation comprises at least one of a vertical or horizontal orientation of each product or a backward or forward orientation of each product.

12. The shelf space allocation management method according to claim 7, further comprising determining that the allocation status of the plurality of products matches the predetermined allocation status of the plurality of products when a number of products reflected in the second image is greater than or equal to a predetermined number of products.

13. A non-transitory computer readable medium having stored therein a shelf space allocation management program causing a computer to perform a shelf space allocation management process for managing a plurality of products allocated on a shelf among a plurality of shelves using a mobile imaging device movable in a store, the shelf space allocation management process comprising:

acquiring a first image taken by the mobile imaging device configured to move in a store under an automatic tracking mode configured to track a clerk;

determining whether the clerk located in the store and captured in the first image has performed a predetermined action on the shelf;

specifying position information of the shelf for a product allocation inspection, wherein the position information is assumed to be changed in product allocation due to the predetermined action on the shelf;

changing the automatic tracking mode to a position control mode directing movement according to position information of the mobile imaging device and a target position determined in advance after specifying the position information of the shelf;

moving a drone having the mobile imaging device and configured to automatically track a person located in the store to an image-capture position in a direction according to the position information of the shelf in the position control mode;

adjusting the direction of the mobile imaging device upon determining that the mobile imaging device arrives at the image-capture position in the position control mode;

controlling the mobile imaging device to capture a second image on the shelf at the image-capture position;

determining whether a type and an allocation status of a plurality of products reflected in the second image match a predetermined type and a predetermined allocation status of the plurality of products; and executing the product allocation inspection based on a determination result of the type and the allocation status of the product.

14. The non-transitory computer readable medium according to claim 13, wherein
the predetermined action is determined using a third image of the person captured by a secondary imaging device fixed at a predetermined position in the store as to whether the person has displayed the product on the shelf.

15. The non-transitory computer readable medium according to claim 13, wherein
the predetermined action is determined using a third image of the person captured by a secondary imaging device fixed at a predetermined position in the store as to whether the person has repeatedly extended an arm toward at least one of the plurality of products on the shelf a predetermined number of times in a predetermined period of time.

16. The non-transitory computer readable medium according to claim 13, wherein the shelf space allocation management process further comprises executing the product allocation inspection in a first time interval which is determined for each product among the plurality of products in advance or in a second time interval which is determined for each shelf among the plurality of shelves in advance.

17. The non-transitory computer readable medium according to claim 13, wherein the shelf space allocation management process further comprises estimating an allocated orientation of each product, wherein the allocated orientation comprises at least one of a vertical or horizontal orientation of each product or a backward or forward orientation of each product.

18. The non-transitory computer readable medium according to claim 13, wherein the shelf space allocation management process further comprises determining that the allocation status of the plurality of products matches the predetermined allocation status of the plurality of products when a number of products reflected in the second image is greater than or equal to a predetermined number of products.

* * * * *